(12) United States Patent
Kapoor et al.

(10) Patent No.: US 11,916,912 B2
(45) Date of Patent: Feb. 27, 2024

(54) METHOD AND SYSTEM FOR PROVIDING SECURE ACCESS TO IoT DEVICES USING ACCESS CONTROL

(71) Applicant: Aeris Communications, Inc., San Jose, CA (US)

(72) Inventors: Karan Kapoor, New Delhi (IN); Asit Goel, Noida (IN); Drew Johnson, San Jose, CA (US); Amit Khetawat, San Jose, CA (US)

(73) Assignee: Aeris Communications, Inc., San Jose, CA (US)

( * ) Notice: Subject to any disclaimer, the term of this patent is extended or adjusted under 35 U.S.C. 154(b) by 31 days.

(21) Appl. No.: 16/998,321

(22) Filed: Aug. 20, 2020

(65) Prior Publication Data

US 2021/0058399 A1 Feb. 25, 2021

Related U.S. Application Data

(60) Provisional application No. 62/889,689, filed on Aug. 21, 2019.

(51) Int. Cl.
*H04L 9/40* (2022.01)
*G06F 9/54* (2006.01)

(52) U.S. Cl.
CPC ............ *H04L 63/101* (2013.01); *G06F 9/547* (2013.01); *H04L 63/0272* (2013.01); *H04L 63/0876* (2013.01); *H04L 63/102* (2013.01)

(58) Field of Classification Search
CPC ............... H04L 63/101; H04L 63/0272; H04L 63/0876; H04L 63/102; G06F 9/547
See application file for complete search history.

(56) References Cited

U.S. PATENT DOCUMENTS

| | | | |
|---|---|---|---|
| 9,584,482 B2 | 2/2017 | Burns | |
| 9,608,997 B2 | 3/2017 | Nicodemus | |
| 9,762,556 B2 | 9/2017 | James | |
| 10,225,245 B2 | 3/2019 | Pace | |
| 10,333,929 B2 | 6/2019 | Setchell | |
| 10,673,838 B2 | 6/2020 | Pawar | |
| 2014/0046751 A1* | 2/2014 | Akbar | G06Q 30/0239 705/14.39 |
| 2015/0288678 A1* | 10/2015 | Chen | H04L 63/083 726/7 |

(Continued)

OTHER PUBLICATIONS

Blockstrand et al., "Operator opportunities in the internet of things", Ericsson Review 1 2011.

*Primary Examiner* — Harris C Wang
(74) *Attorney, Agent, or Firm* — Shih IP Law Group, PLLC

(57) ABSTRACT

A computer-implemented method, system and computer program product for providing secure access to devices enabled for connectivity using access control are disclosed. The computer-implemented method for providing secure access to devices enabled for connectivity comprises dynamically associating each of the one or more devices to at least one user account; assigning an IP address to each of the one or more devices enabled for connectivity; dynamically generating at least one access-control list (ACL) for each of the one or more devices associated with the at least one user account; and restricting access only to the at least one user account via ACL generated for the one or more devices.

21 Claims, 10 Drawing Sheets

(56) References Cited

U.S. PATENT DOCUMENTS

| | | | |
|---|---|---|---|
| 2016/0087933 A1* | 3/2016 | Johnson | H04L 41/08 709/245 |
| 2017/0054564 A1* | 2/2017 | Bone | H04L 63/0272 |
| 2017/0272554 A1* | 9/2017 | Kwan | H04L 63/0272 |
| 2018/0103039 A1* | 4/2018 | Thaler | H04L 67/12 |
| 2018/0115611 A1* | 4/2018 | Lear | H04L 41/28 |
| 2018/0307851 A1* | 10/2018 | Lewis | G06F 21/44 |
| 2020/0177485 A1 | 6/2020 | Shurtleff | |
| 2020/0177589 A1 | 6/2020 | Mangalvedkar | |
| 2021/0058399 A1* | 2/2021 | Kapoor | H04L 63/102 |

* cited by examiner

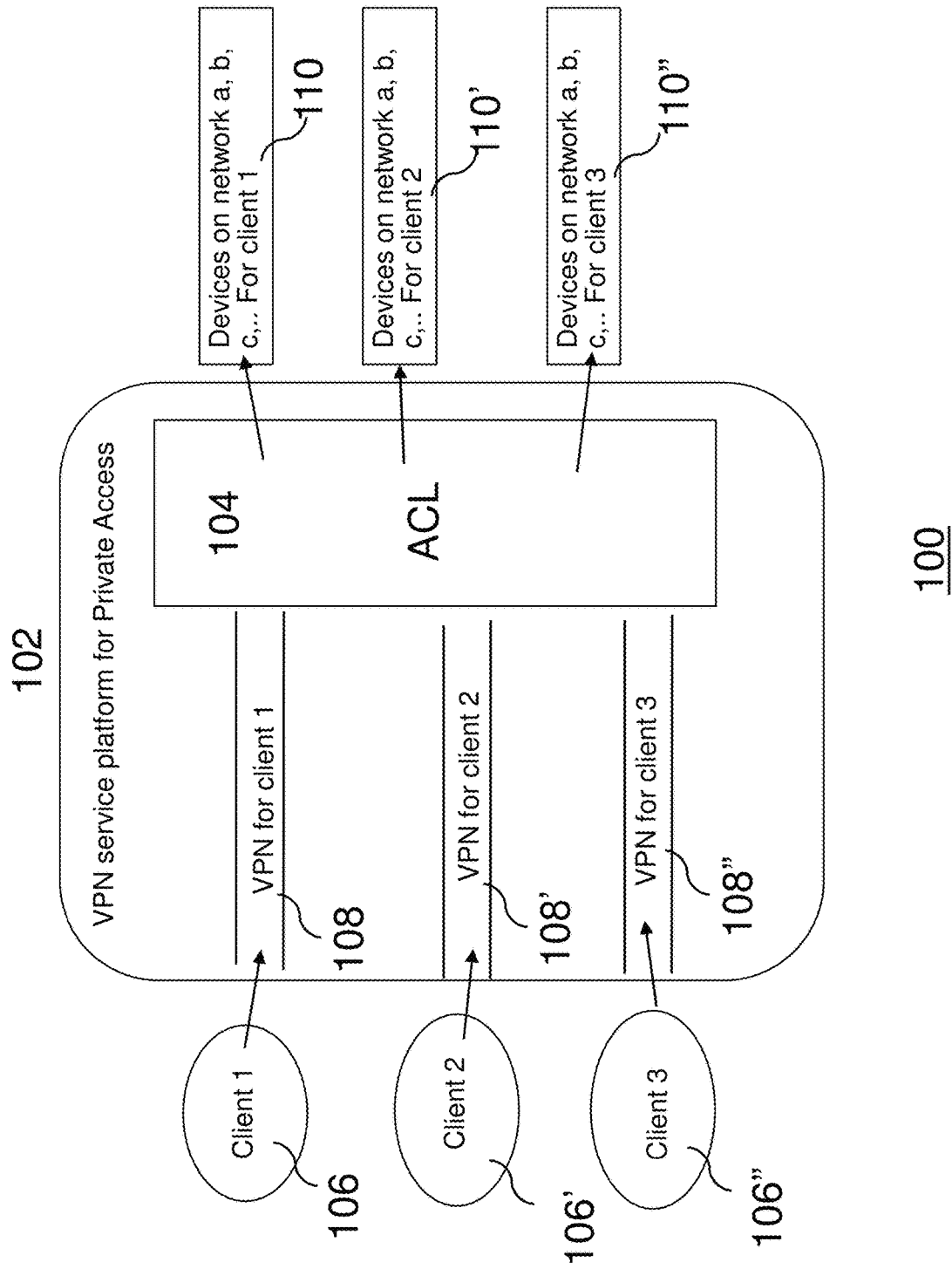

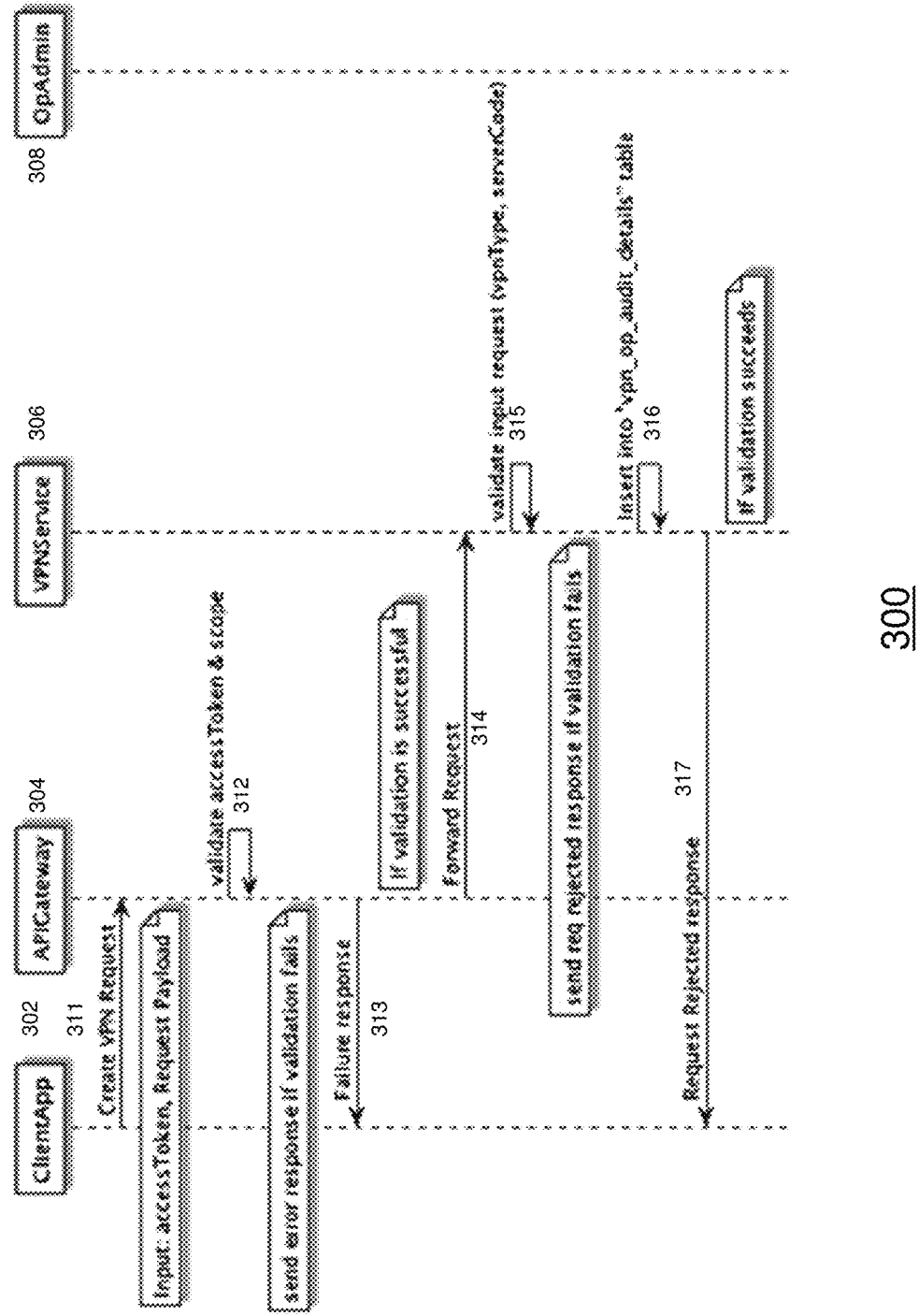

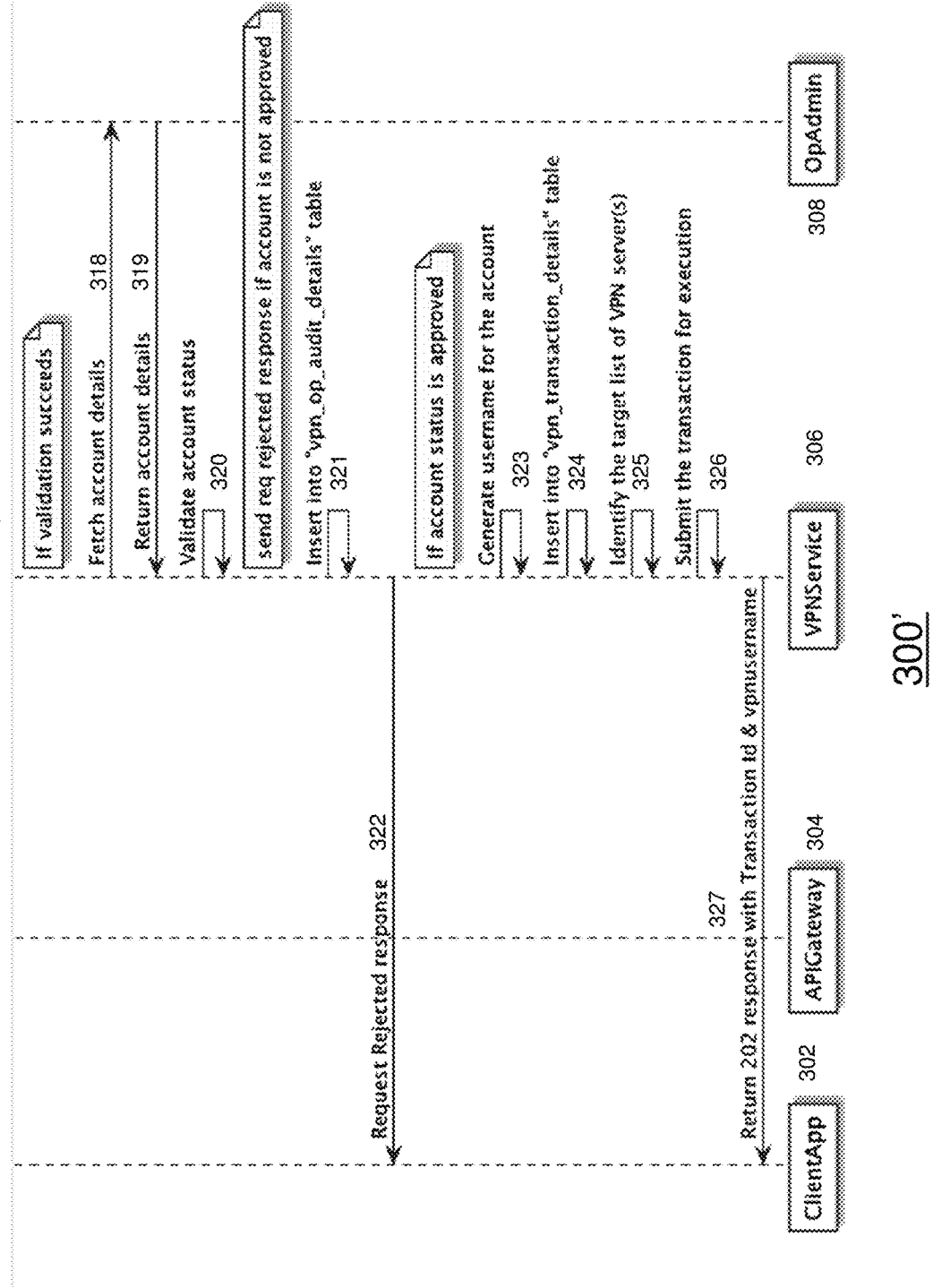

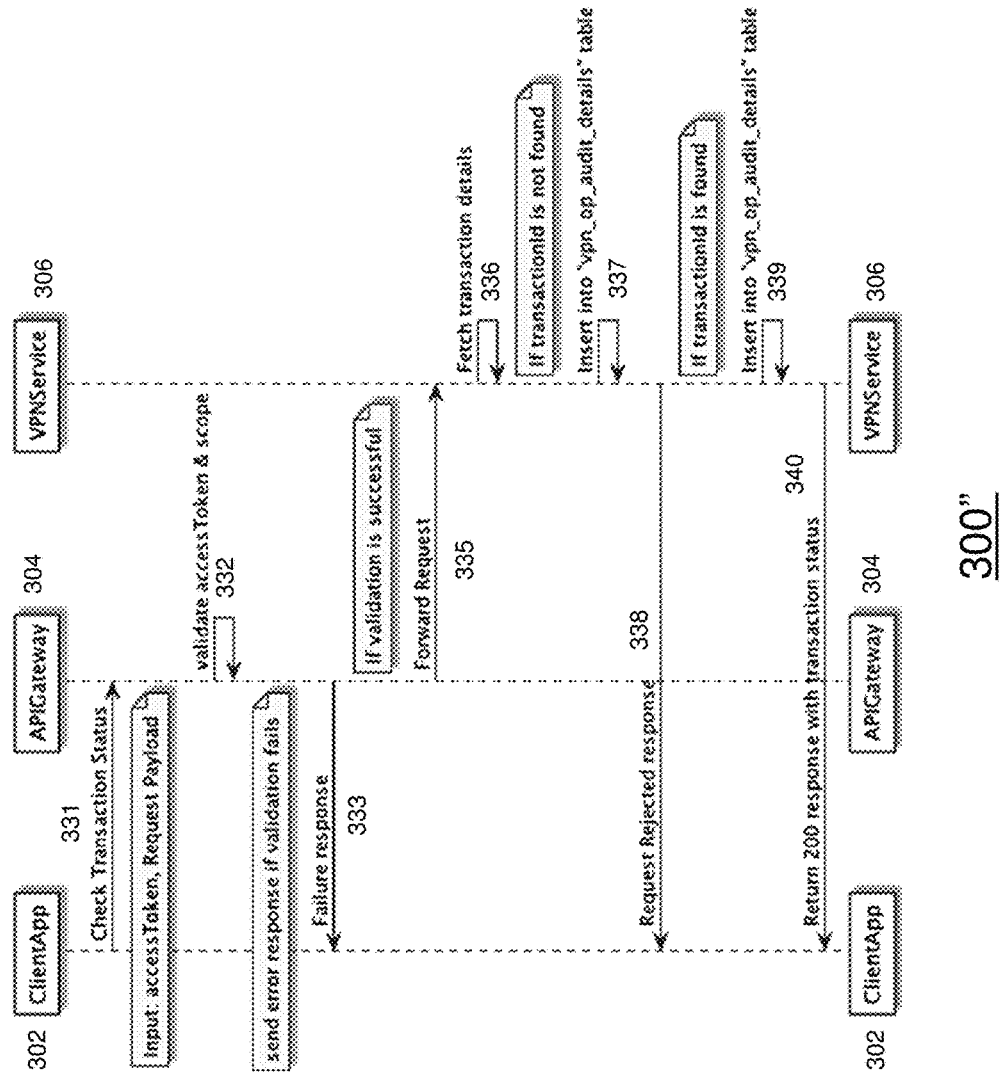

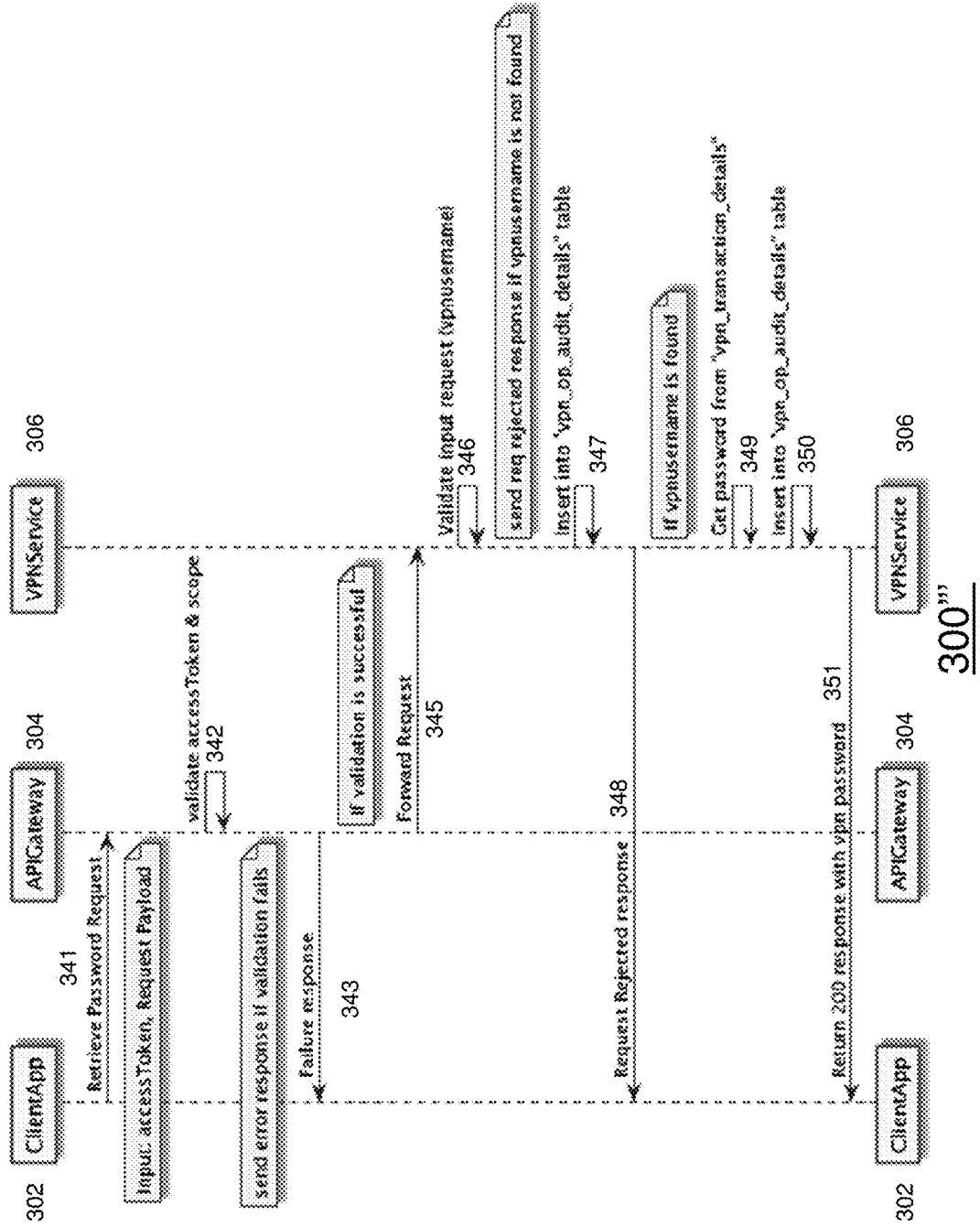

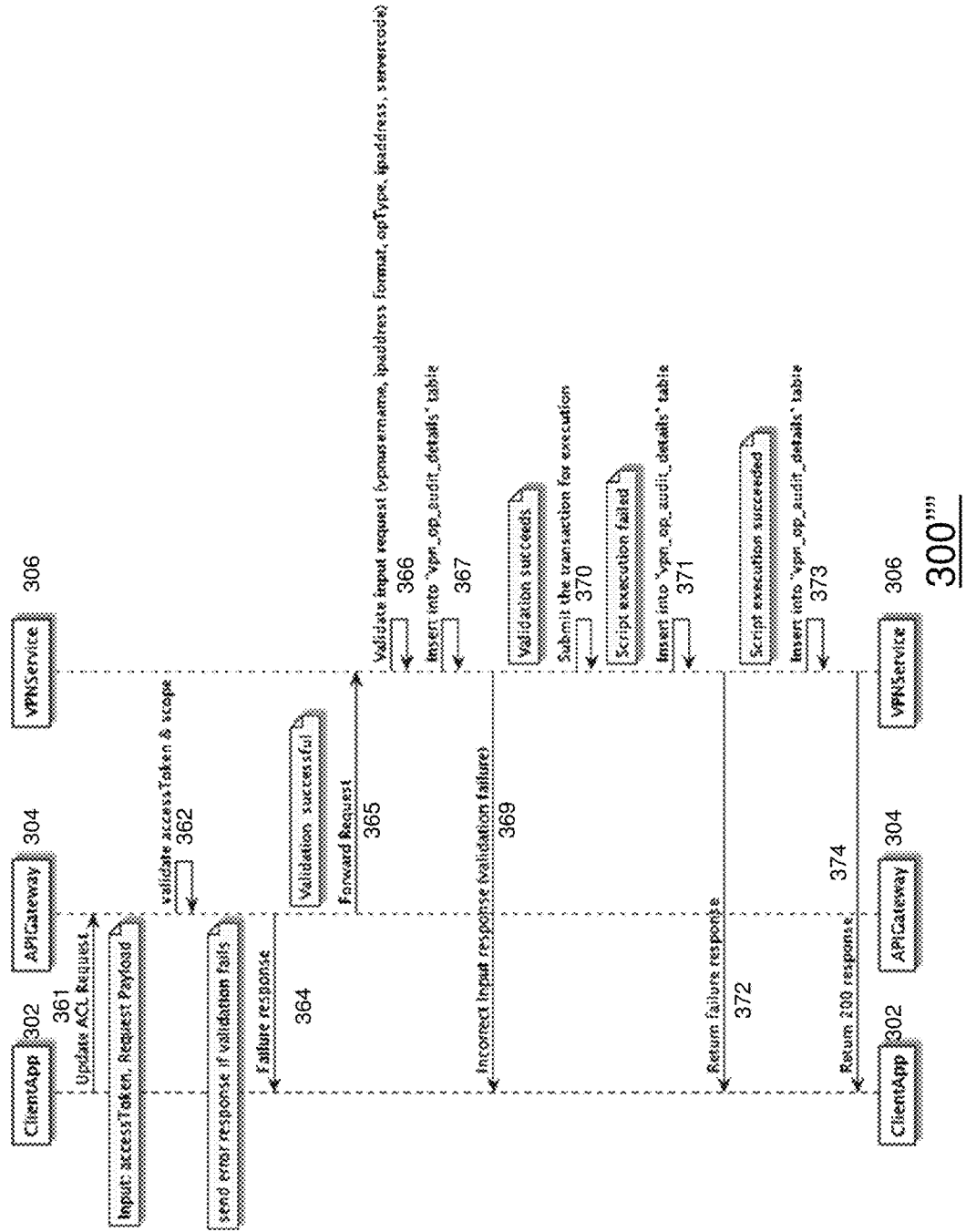

Remove VPN Credentials

METHOD AND SYSTEM FOR PROVIDING SECURE ACCESS TO IoT DEVICES USING ACCESS CONTROL

CROSS-REFERENCE TO RELATED APPLICATION

Under 35 USC 119(e), this application claims priority to U.S. provisional application No. 62/889,689, filed Aug. 21, 2019, entitled "METHOD AND SYSTEM FOR PROVIDING SECURE ACCESS TO IoT DEVICES USING VIRTUAL PRIVATE NETWORK", which is herein incorporated by reference in its entirety.

FIELD OF THE INVENTION

The present invention relates generally to management of access to M2M or Internet of Things (IoT) devices connected to cellular or other wireless networks using access control.

BACKGROUND

M2M or Internet of Things (IoT) devices, such as sensors, monitors, telematics devices, and security equipment, are generally designed to collect and transmit data via connection to networks, such as wireless or cellular networks, and contain radio modules or other types of hardware, such as Subscriber Identity Modules (SIMs), enabling that connection. Frequently, these IoT devices are configured to connect to cellular networks operated by Mobile Network Operators (MNOs) and/or Mobile Virtual Network Operators (MVNOs) due to the broad geographic coverage of cellular networks. Persons deploying these IoT devices often need to access these devices remotely using wireless networks for management and administrative purposes, such as maintenance, installation of updates or other administrative tasks.

One common way to access devices attached to networks, including cellular networks, is through connecting to the IP address associated with the device. To create a secure means for accessing devices over open cellular networks, service providers can establish virtual private networks (VPNs) unique to specific customers or stakeholders that allow only persons and devices who have been issued credentials by the stakeholder to access the VPN and access the IP addresses of other nodes (either users or devices) on the same VPN.

Sometimes a stakeholder or master user (e.g., a company with multiple sub-dealers such as Original Equipment Manufacturer (OEM)) needs to create access credentials for large volumes of devices that will be accessible through a VPN while simultaneously limiting which IP addresses associated with devices on the VPN a user can access, using access control lists (ACLs). While creating access credentials and ACLs can be performed manually, this manual action becomes cumbersome and can be error-prone when large deployments of IoT devices are involved. What is needed is an automated way to create VPN credentials and ACLs, preferably at the time that devices are first provisioned for operation on the cellular network.

Accordingly, what are needed are system and method to address the above identified issues. The present invention addresses such a need.

SUMMARY

A computer-implemented method, system and computer program product for providing secure access to devices enabled for connectivity using access control are disclosed. The computer-implemented method for providing secure access to devices enabled for connectivity comprises dynamically associating each of the one or more devices to at least one user account; assigning an Internet Protocol (IP) address to each of the one or more devices enabled for connectivity; dynamically generating at least one access-control list (ACL) for each of the one or more devices associated with the at least one user account; and restricting access only to the at least one user account via ACL generated for the one or more devices.

The system for providing secure access to one or more devices enabled for connectivity using access control comprises a network carrier interconnect, one or more devices enabled for connectivity, an application programming interface gateway; and an access control service; wherein the access control service dynamically associates each of the one or more devices to at least one user account; assigns an IP address to each of the one or more devices enabled for connectivity; dynamically generates at least one access-control list (ACL) for each of the one or more devices associated with the at least one user account; and restricts access only to the at least one user account via ACL generated for the one or more devices.

In an embodiment, a computer program product for providing secure access to one or more devices enabled for connectivity using access control is also disclosed. The computer program product stored on a non-transferable computer readable medium, comprising computer readable instructions for causing a computer to control an execution of an application for providing secure access to devices enabled for connectivity using access control, the computer readable instructions comprising: dynamically associating each of the one or more devices to at least one user account; assigning an IP address to each of the one or more devices enabled for connectivity; dynamically generating at least one access-control list (ACL) for each of the one or more devices associated with the at least one user account; and restricting access only to the at least one user account via ACL generated for the one or more devices.

BRIEF DESCRIPTION OF THE DRAWINGS

FIG. 1A illustrates an exemplary system 100 and process used for providing secure access to IoT devices using access control on virtual private network in accordance with one or more embodiments of the present invention.

FIGS. 3A-3F illustrate example criteria used for providing secure access to IoT devices using access control on virtual private network in accordance with one or more embodiments of the present invention.

DETAILED DESCRIPTION

Figure 1B:
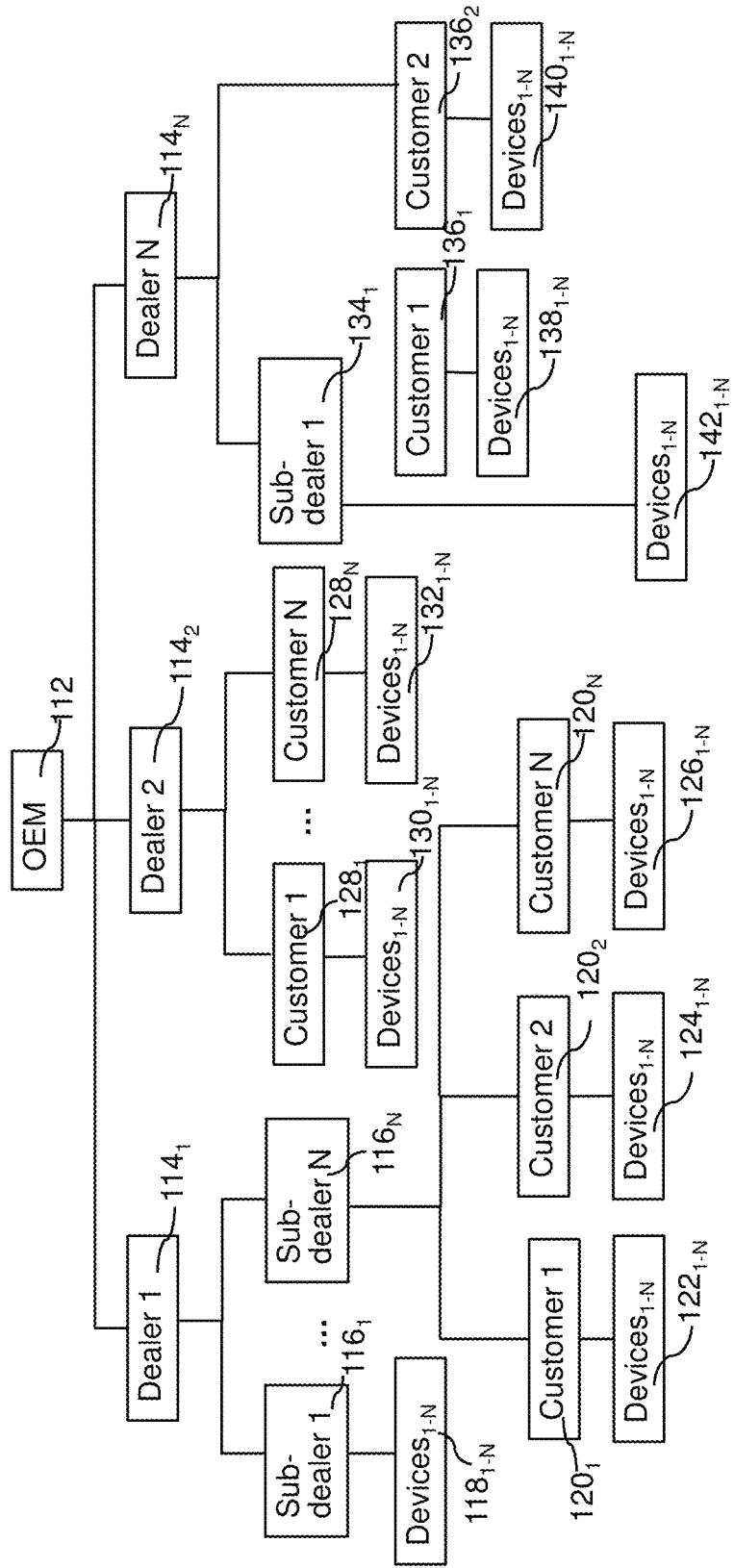
FIG. 1B illustrates an exemplary system 100' and process used for providing secure access to IoT devices using access control on virtual private network in accordance with one or more embodiments of the present invention.

The present invention relates generally to management of access to M2M or Internet of Things (IoT) devices connected to cellular or other wireless networks, and more particularly to management of access to such devices while they are connected to a virtual private network.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Although the invention is described with respect to products such as a Subscriber Identity Module (SIM), as used herein the term "product" is intended to be inclusive, interchangeable, and/or synonymous with appliances, electronic modules, telephony or radio equipment and other similar products that require registration with a MNO or other service provider of distinct identifying numbers, such as ICCIDs, IMSIs, MEIDs or other serial numbers as described further below and collectively referred to herein as "numbers", for that product to receive services from a service provider, though one will recognize that functionally different types of products may have characteristics, functions and/or operations which may be specific to their individual capabilities and/or deployment.

Devices such as M2M or Internet of Things (IoT) devices, including sensors, monitors, telematics units, security equipment or other types of hardware, frequently contain radio or telephony equipment, such as Subscriber Identity Modules (SIMs), enabling the devices to connect wirelessly to networks, such as cellular networks, and transmit data over such networks. These IoT devices often do not have access to the public internet (e.g., through a local-area network established by a building owner for wired or wireless access to an internet-service provider service) because they are mobile (for example, installed in moving equipment such as vehicles), in remote locations, such as agricultural areas, or deployed by stakeholders, such as security service providers, who do not control any local networks established in a building, they are frequently equipped to and configured to connect to cellular networks operated by MNOs and/or MVNOs, which are available over broad geographic areas. Persons deploying these IoT devices often need to access these devices remotely using wireless networks for management and administrative purposes, such as maintenance, installation of updates or other administrative tasks.

One common way to access devices attached to networks, including cellular networks, is through connecting to the IP address associated with the device. To create a secure means for communicating with and accessing devices over cellular networks, service providers frequently establish virtual private networks (VPNs) unique to specific customers or stakeholders that allow only persons and devices who have been issued credentials by the stakeholder to access the VPN and communicate with or access other nodes (either users or devices) on the same VPN using the IP address of the node.

Sometimes a stakeholder or master user (e.g., a company with multiple sub-dealers) needs to create access credentials for large volumes of devices that will be accessible through a VPN while limiting which nodes, or IP addresses, on the VPN a user can access, using access control lists (ACLs). While ACLs can be created and administered manually, this manual action becomes cumbersome and can be error-prone when large deployments of IoT devices are involved. What is needed is an automated way to create ACLs, preferably at the time that devices are first provisioned for operation on the cellular network.

To overcome the issues described above, a service provider, including an MNO or other provider of connectivity services, can implement a method for allowing customers or other stakeholders, such as government entities, businesses, original equipment manufacturers (OEMs) to create sub-accounts for their different users (such as separate dealers of a business, separate agencies of a government), issue unique and secure credentials to such users to access the VPN established by the service provider, and, at time of provisioning IoT devices for operation on a cellular network, use application programming interfaces (APIs) to assign VPN access credentials to IoT devices on a bulk basis and to assign specific IoT devices to a user account in a manner that allows that user, when attached to the VPN, only to see and access those IoT devices provisioned under its account.

In one or more embodiments, the method and system provides on-demand dynamic allocation of a distinct IP pool of IP addresses to a user account, creation of VPN credentials for and assignment of IP addresses from the allocated IP pool to a large number of IoT devices (e.g., in the range of 1000) associated with the designated user account, and restriction of user access through dynamic creation and modification of access-control lists to only those devices visible on the VPN that are provisioned under that user's respective account.

Assignment of network access credentials to users and management of endpoints or nodes, such as devices, that may be accessed by a user are traditionally managed manually on a case by case basis by authorized professionals who manage networks. When the number of customer users, such as dealers, requiring access credentials is large, and if the number of IoT devices to be provisioned and assigned to specific accounts or users is large, the traditional method may require stakeholders to use repetitive, time-consuming and costly manual processes prone to human error, which could lead to delays in providing needed access or improper (or unsuccessful) access if errors are introduced.

To overcome the above limitations, the method and system described herein provides an automated approach for orchestrating the creation of secure network access for different users that limits each user's access to provisioned devices assigned to such user's account. The method provides for development and use of a set of APIs that provides a way to manage, on demand, the assignment of VPN credentials and virtual IP pools and the creation and management of access control lists. Stakeholders who have access to these APIs are enabled thereby to create VPN credentials for authorized sub-users and provisioned devices, and also to control the devices that each such sub-user can access.

To describe the features of the present invention in more detail within the context of IoT devices with products such as SIMs installed in them, for example, vehicles or sensors, refer to the accompanying figures in conjunction with the following discussions. Although, the invention is described with reference to IoT devices, it is about software defined networking and may be used in other areas as well. The pertinent features of the invention include dynamic allocation of IP Address pools wherein the IP Addresses may be grouped as white-list/black-list to allow and/or deny access to certain entities/devices. These examples are used for purpose of illustration only, and should not be construed as limitations.

The embodiments described herein disclose a computer-implemented method, system and computer program product for providing secure access to devices enabled for connectivity using access control.

The computer-implemented method for providing secure access to devices enabled for connectivity comprises dynamically associating each of the one or more devices to at least one user account; assigning an IP address to each of the one or more devices enabled for connectivity; dynamically generating at least one access-control list (ACL) for each of the one or more devices associated with the at least one user account; and restricting access only to the at least one user account via ACL generated for the one or more devices.

The system for providing secure access to one or more devices enabled for connectivity using access control comprises a network carrier interconnect, one or more devices enabled for connectivity, an application programming interface gateway; and an access control service; wherein the access control service dynamically associates each of the one or more devices to at least one user account; assigns an IP address to each of the one or more devices enabled for connectivity; dynamically generates at least one access-control list (ACL) for each of the one or more devices associated with the at least one user account; and restricts access only to the at least one user account via ACL generated for the one or more devices.

The computer program product stored on a non-transferable computer readable medium, comprising computer readable instructions for causing a computer to control an execution of an application for providing secure access to devices enabled for connectivity using access control, the computer readable instructions comprising: dynamically associating each of the one or more devices to at least one user account; assigning an IP address to each of the one or more devices enabled for connectivity; dynamically generating at least one access-control list (ACL) for each of the one or more devices associated with the at least one user account; and restricting access only to the at least one user account via ACL generated for the one or more devices.

In one or more embodiments, the method and system provides on-demand dynamic allocation of a distinct IP pool of IP addresses to a user account, creation of VPN credentials for and assignment of IP addresses from the allocated IP pool to a large number of IoT devices (e.g., in the range of 100s or 1000s etc.) associated with the designated user account, and restriction of user access through dynamic creation and modification of access-control lists to only those devices visible on the VPN that are provisioned under that user's respective account.

Although the method, system and computer program product described herein use virtual private network (VPN), the method, system and computer program product may also be used on systems that use a communication network but do not require use of VPN.

Multiple stakeholders, including original equipment manufacturers (OEMs), dealers and sub-dealers, network service providers and customers, may have an ongoing need after initial deployment to manage IoT devices. Because these devices may be deployed widely across geographic regions or may be installed in equipment or in buildings and may be difficult to access physically, there is a need to be able to remotely access the devices using their unique IP addresses over wireless communications networks using secure methods. Such access needs may include delivery of software updates, such as critical security patches, management of settings, management of lists of endpoints to which the device should send data, etc. To promote security, stakeholders will routinely prevent devices being accessed over networks by unknown entities, creating a need for allowing devices to accept communications or access requests only from trusted entities. Virtual Private Networks (VPNs) are commonly used to facilitate this mutual trust; the device has configured within it a software client that specifies the specific type of VPN that can request access, and allows access only after a user who is authorized under the account associated with the VPN to access that specific device has presented the correct access credentials to the VPN. To prevent remote access to devices by parties who are not authorized to perform any administrative functions with respect to that device, Access Control Lists can be used to specify which stakeholders can access which devices, to obtain remote access only to specific lists of devices.

VPN tunnel provides a secure connection for transfer of data packets that contain the necessary instructions or updates. However, providing a VPN tunnel for establishing point-to-point connection between each and every device and the OEM and/or a particular dealer/sub-dealer's server via a dedicated circuit requires dedicated hardware. Use of software VPN that uses an application running on a server, which can be as simple as a laptop computer or a personal computer, overcomes this hardware requirement as it does not require dedicated hardware to run a VPN. The software VPN also offers ease of scalability.

However, software VPN may face security issues. The software VPN creation process as currently used is a manual process (MOP) which requires a form, having all the relevant details, to be filled in by the customer/sales/engineering (SE) team. Additionally, the currently available software VPN's do not maintain Access Control Lists (ACLs) against the account. Therefore, this process of creating a software VPN is error-prone, time consuming and can be repetitive as the vendor may need to create a software VPN for each and every dealer and sub-dealer accounts and for individual devices belonging to those accounts manually as the existing VPN tool doesn't support creating/managing software VPN & ACLs.

The method and system described herein may be beneficial over the manual method described above as the software VPN creation process for OEM is automated, and thus may not require any human intervention. The method and system manages the ACL's (access control lists) across the hierarchy of accounts in an automated way. The complexity is with managing access of the end-users to the devices (deployed on a private network) that belong to their account only. Additionally, the access needs to be managed across accounts hierarchy, for example, a user belonging to a parent account can access devices that are under its children account but not vice-a-versa.

Once user credentials (username/password) are set for a customer, a default ACL per VPN user is also set up. The system and method may then dynamically update ACL/s for each user based on device status automatically using IP addresses of the devices. The device status may be defined as active when the device provisioned and/or being billed or suspended when the device is active on the network but not billed to the customer, and the device is defined as inactive when the device is either not provisioned or cancelled although it was once provisioned before. The device status may be "Billed" when the customer is actively being charged for the usage of device. Additionally or alternatively, the system and method may also provide capability to retrieve password for an existing VPN user. Additionally or alternatively, the system and method may also provide capability to reset password for an existing VPN user.

The automated method for providing secure access to devices enabled for connectivity using access control on virtual private network uses a software defined networking approach. The software defined networking approach includes a set of application programming interfaces (API's), also known as a microservice, that provides a method to manage on-demand VPN credentials, virtual IP pools and access control lists. Users who are provided with an access to these API's can create their VPN credentials and also control the devices that they can access. Creating or generating VPN credentials may include dynamically assigning an IP address to the at least one user account.

The software VPN tool thus created may be secured using various methods including use of secure socket layer (SSL) where API's would be accessible only via Hypertext Transfer Protocol Secure (HTTPS); use of access token where client applications need to pass valid authorization token to get access to the API's; and/or API Gateway, e.g., Kong API Gateway, where the API gateway would be the entry point for the above API's, thus ensuring security via token & scope validation. The access to the database used for authentication and authorization may be secured by credentials, for example, the virtual machines hosting the StrongSwan servers may be secured by private keys which can be rotated automatically to prevent any compromise with the security. Since the VPN servers do not have access to Internet, there is no possibility of phishing attacks.

The VPN service may be deployed separately in a cluster, e.g., two or more nodes, to ensure high availability. Additionally or alternatively, for database, Platform as a Service (PaaS), e.g., Google Cloud Platform (GCP) Cloud SQL for MySQL or Amazon Web Services Relational Database Service (AWS RDS) for MySQL, may be utilized to ensure high availability. Using public cloud services such as GCP CSQL or AWS RDS may allow for easy setup, operation and scalability of the database. The VPN service API may be front-ended by load balancer to ensure load balancing at application and/or network level. Along with this, the VPN Server, for example, StrongSwan server, may also be setup in a cluster to ensure high availability. Each cluster may include two or more VPN servers. The VPN servers may be front-ended by a load balancer. Depending on the type of servers are used as VPN server clusters, the cluster may or may not support failover.

FIG. 1A illustrates an exemplary system 100 and process for providing secure access to devices enabled for connectivity using access control on virtual private network in accordance with an embodiment of the present invention. In an embodiment, the system 100 for providing secure access to devices enabled for connectivity using access control on virtual private network includes one or more VPN clients shown as 106, 106', 106" etc., a VPN service platform for private access 102 for providing VPN access to devices which may be deployed on different networks shown as 110, 110', 110" etc. and access control list (ACL) 104, and one or more VPNs 108, 108', 108" etc. created for different clients 106, 106', 106" etc.

The devices deployed for each client shown as 110, 110', 110" etc. may be deployed on networks provided by different network providers or same network providers for a particular client. For example, the devices for client 1 may be deployed on two networks such as AT&T and Verizon, whereas the devices for client 2 may be deployed on three networks such as AT&T, Sprint and Verizon and the devices for client 3 may all be deployed on a single network such as T-Mobile etc.

In an embodiment, the solution or platform including VPN service platform for private access 102 may be used to allow secured access to multiple devices that may be deployed on the same carrier or may be deployed on different carriers. In an exemplary embodiment, the solution or platform may cater to two different MNO's such as but not limited to AT&T & Verizon or MVNO's that may represent one or more MNO's and/or facilitate connectivity through one or more MNO's. For example, an MVNO may provide connectivity through one or more MNOs. Therefore, a device which may be deployed on, for example, either AT&T or Verizon network, can be reached using this solution or platform as long as there is connectivity between the VPN server and the MNO network either directly or via MVNO.

Virtual Private Networks (VPNs) are commonly used to facilitate this mutual trust; the device has configured within it a software client that specifies the specific type of VPN that can request access, and allows access only after a user who is authorized under the account associated with the VPN to access that specific device has presented the correct access credentials to the VPN. To prevent remote access to devices by parties who are not authorized to perform any administrative functions with respect to that device, Access Control Lists can be used to specify which stakeholders can access which devices, to obtain remote access only to specific lists of devices.

For example, a service provider, including an MNO or other provider of connectivity services, e.g. MVNO, can implement a method for allowing customers or other stakeholders, such as government entities, businesses, original equipment manufacturers (OEMs) to create sub-accounts for their different users (such as separate dealers of a business, separate agencies of a government), issue unique and secure credentials to such users to access the VPN established by the service provider, and at the time of provisioning the IoT devices for operation on one or more cellular networks, use application programming interfaces (APIs) to assign VPN access credentials to the IoT devices on a bulk basis. The service provider may also assign specific IoT devices to a user account, at the time of provisioning the IoT devices, in a manner that allows that user, when attached to the VPN, to only see and access those IoT devices provisioned under its account.

The method and system described herein provides an automated approach for orchestrating the creation of secure network access for different users that limits each user's access to provisioned devices assigned to such user's account. The method provides for development and use of a set of APIs that provides a way to manage, on demand, the assignment of VPN credentials and virtual IP pools and the creation and management of access control lists. Stakeholders who have access to these APIs are enabled thereby to create VPN credentials for authorized sub-users and provisioned devices, and also to control the devices that each such sub-user can access. Creating or generating VPN credentials may also include dynamically assigning an IP address to the at least one user account. FIG. 1B depicts an exemplary account hierarchy and the devices belonging to respective accounts in the hierarchy.

In one or more embodiments, the method and system provides on-demand dynamic allocation of a distinct IP pool of IP addresses to a user account, creation of VPN credentials for and assignment of IP addresses from the allocated IP pool to a large number of IoT devices (e.g., in the range of 1000) associated with the designated user account, and restriction of user access through dynamic creation and modification of access-control lists to only those devices visible on the VPN that are provisioned under that user's respective account.

FIG. 1B illustrates an exemplary system 100' and process used for providing secure access to IoT devices using access control on virtual private network in accordance with one or more embodiments of the present invention. FIG. 1B depicts an exemplary account hierarchy and the devices belonging to respective accounts in the hierarchy used for managing the ACL's (access control lists) across the hierarchy of accounts in an automated way. The complexity is with managing access of the end-users to the devices (deployed on a private network) that belong to their account only. Additionally, the access needs to be managed across accounts hierarchy, for example, a user belonging to a parent account can access devices that are under its children account but not vice-a-versa.

As illustrated in FIG. 1B, a service provider, including an MNO or other provider of connectivity services, can implement a method for allowing customers or other stakeholders, such as government entities, businesses, original equipment manufacturers (OEMs) 112 to create sub-accounts for their different users, such as separate dealers of a business $114_1$-$114_N$, their sub-dealers, e.g., $116_1$, $116_2$, $134_1$ and/or their customers, e.g., $120_{1-N}$, $128_{1-N}$, $136_{1-N}$ etc., issue unique and secure credentials to such users to access the VPN established by the service provider, and, at time of provisioning IoT devices, e.g., $122_{1-N}$, $130_{1-N}$, $138_{1-N}$, etc., for operation on a cellular network, use application programming interfaces (APIs) to assign VPN access credentials to IoT devices, e.g., $122_{1-N}$, $130_{1-N}$, $138_{1-N}$, etc., on a bulk basis and to assign specific IoT devices to a user account. For example, devices $122_{1-N}$, are assigned to Customer 1 $120_1$ in a manner that allows Customer 1 $120_1$, when attached to the VPN, only to see and access IoT devices $122_{1-N}$ provisioned under its account. Thus, Customer 1 $120_1$ when attached to the VPN, cannot access any other devices provisioned under other accounts for that OEM 112.

In an embodiment, the primary account, for example, an OEM 112, or a parent account such as a dealer, for example, any one or more of $114_1$-$114_N$, or a sub-dealer e.g., $116_1$, $116_2$, $134_1$ or a customer e.g., $122_{1-N}$, $130_{1-N}$, $138_{1-N}$, etc., may allow access to the subaccounts in a hierarchical order such that a user or a child account belonging to that parent account can access devices, e.g., $122_{1-N}$, $130_{1-N}$, $138_{1-N}$, etc., that are under its own account (child account) but the user belonging to a child account cannot access the devices under its parent account including the device under other child accounts of that parent account other than the devices under its own account.

In another embodiment, where the primary account, for example, an OEM 112, comprises one or more user accounts (child accounts), for example, a dealer, e.g., $114_1$-$114_N$, or a sub-dealer e.g., $116_1$, $116_2$, $134_1$ or a customer e.g., $122_{1-N}$, $130_{1-N}$, $138_{1-N}$, etc., access to the one or more devices e.g., $122_{1-N}$, $130_{1-N}$, $138_{1-N}$, etc., by the one or more user accounts (child accounts) is controlled and managed by the primary account, for example, an OEM 112, which may include providing access to a child account to the devices belonging to another child account.

In yet another embodiment, where the parent account (for example, an OEM 112 or a dealer, for example, any one or more of $114_1$-$114_N$, or a sub-dealer e.g., $116_1$, $116_2$, $134_1$ or a customer e.g., $122_{1-N}$, $130_{1-N}$, $138_{1-N}$, etc.) comprises one or more user accounts (child accounts), access to the one or more devices e.g., $122_{1-N}$, $130_{1-N}$, $138_{1-N}$, etc., by the one or more user accounts (child accounts) is controlled and managed by the parent account, which may include providing access to a child account to the devices belonging to the other child account.

Additionally, or alternatively, the end customer or consumer who purchases the device may allow access to a different entity, for example, a third party which may or may not be related to any entity illustrated in the hierarchy, who is managing/monitoring the devices, even though that entity is not part of the hierarchy illustrated in FIG. 1B. For example, an end user or a consumer may purchase a security monitoring system (device) from a dealer, but may contract with another entity which may or may not be related to any entity illustrated in the hierarchy, for managing and/or monitoring the security system (device). In such case the monitoring entity may require access to the device for various purposes. The method, system and the program product described herein allows the end user/consumer to grant that access to the third party either directly or via any of the entities (for example, parent account such as an OEM 112 or a dealer, for example, any one or more of $114_1$-$114_N$, or a sub-dealer e.g., $116_1$, $116_2$, $134_1$ or a customer e.g., $122_{1-N}$, $130_{1-N}$, $138_{1-N}$, etc.) illustrated in FIG. 1B.

Figure 2:
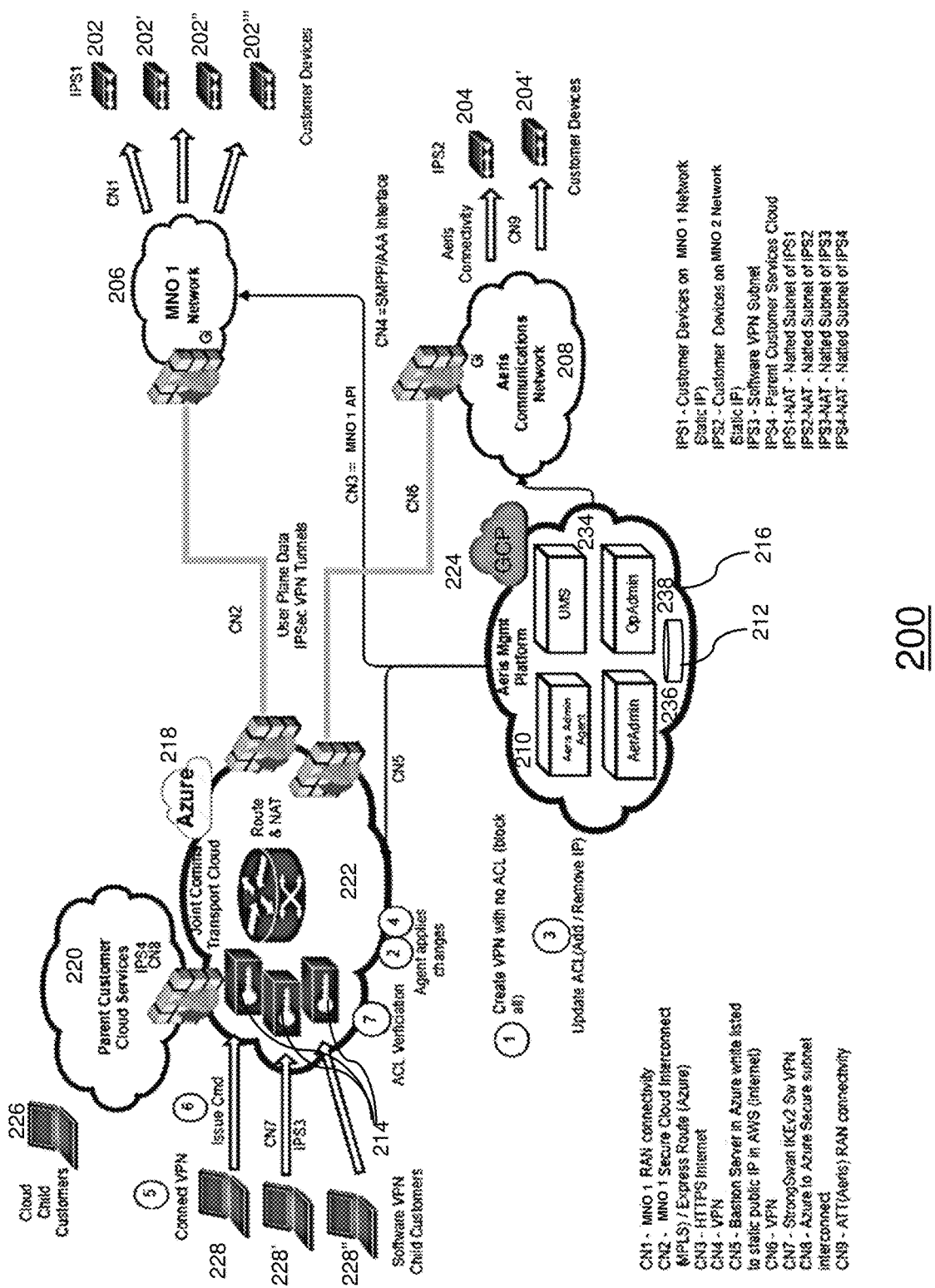
FIG. 2 illustrates an exemplary system and process for providing secure access to IoT devices using access control on virtual private network in accordance with an embodiment of the present invention.

FIG. 2 illustrates an exemplary system 200 and process used for providing secure access to devices enabled for connectivity using access control on virtual private network. The system 200 includes one more devices illustrated as device1 202 . . . device4 202''' which are enabled for connectivity using a connectivity module, e.g., SIM, and a VPN service platform 216, illustrated as Aeris management platform, working in concert with a communication network or MNO 208 for providing connectivity between the client devices and the VPN server, illustrated as Aeris communications network. Device1 202 . . . device4 202''' are also known as customer devices, working on network provided by cellular or other wireless network provider 1 206, e.g., Verizon, and have static IP address. Additionally or alternatively, the system 200 may include one more devices illustrated as device1 204 . . . device2 204' which are enabled for connectivity using a connectivity module, e.g., SIM. Device1 204 . . . device2 204' are also known as customer devices, working on network provided by cellular or other wireless network provider 2 208 shown as Aeris communication network which may itself be a MNO or use a network service provided by another MNO, e.g., AT&T, and have static IP address.

The system 200 may further include a joint communications transport cloud 222, parent customer cloud services 220, e.g., OEM cloud services, network provider-customer/user communications cloud 218, e.g., Azure, or GCP (Google Cloud Provider) or it could be hosted in a private data center. For example, the network provider may be an MNO or MVNO and the customer/user may be an OEM. VPN service platform 216 shown as Aeris management platform that uses some kind of cloud computing service 224, e.g., Amazon Web Services (AWS), Google cloud services or a cloud computing service hosted in a private data center, working in concert with a network provider 208 such as MNO e.g., Verizon, AT&T etc. or MVNO, e.g., *Aeris* communication network, which may also include private data center, and provide connectivity to customer devices deployed on a wireless network provider, for example, AT&T, where the VPN solution provides secure access to these devices. Thus, in an embodiment the deployments of ACL are not specific to a particular cloud provider and may also be hosted in any private data center, and hence the implementation of ACL may be cloud agnostic.

Secure access to the customer devices including device1 202 . . . device4 202''' as well as device1 204 . . . device2 204', enabled for connectivity using access control on virtual private network may be accomplished via VPN service platform for private access 216 working in concert with a communications network 208 using one or more of: at least one VPN account management API 210, for example, *Aeris* Admin agent, (for managing credentials, device access list, etc.), a database for state management & auditing 212, and a VPN Server 214, for example, StrongSwan opensource library, included in joint communications transport cloud 222.

The connections between different components of the system 200 are provided as follows: CN1 indicates network provider 1/MNO 1 206 e.g., Verizon, radio access network (RAN) connectivity to customer devices 202 . . . 202''''; CN2 indicates network provider 1/MNO 1 206 e.g., Verizon, secure cloud interconnect using multiprotocol label switching methodology (MPLS)/Express route to network provider-customer/user communications cloud 218, e.g., Azure, via IPSec VPN tunnel created for user plane data, indicating connectivity between network provider-customer/user communications cloud, for example, Azure, and a network provider, for example, Verizon; CN3 indicates MNO APIs for managing the state lifecycle of the devices 202 . . . 202'''. The devices are provisioned on the network using the MNO 1 API, for example, ThingSpace API provided by Verizon; CN4 indicates VPN pending access. This connectivity is for the MNO to send the network feeds (e.g. AAA, SMPP, HLR); CN5 indicates connection to VPN to provide remote access to software VPN child customers to the devices included in the ACL for that customer; CN6: indicates connectivity between network provider-customer/user communications cloud, for example, Azure, and a network provider, for example, Aeris data center which has internal connectivity with AT&T network; CN7 indicates a VPN connection between the end customer and the VPN servers, for example, StrongSwan servers in Azure cloud; CN8 indicates subnet interconnect, e.g., Azure to Azure; and CN9 indicates network connectivity RAN to customer devices 204 . . . 204' providing secure access to client/customer devices via VPN. This VPN connection then allows end customers to reach out to the devices that are deployed on network 206, for example, Verizon.

The secure subnet interconnect which is a service provided by Azure, illustrated by CN8, for example, connecting two clouds, in this case Azure to Azure secure subnet interconnect as illustrated. In an embodiment, this service may be provided by the cloud service provider. The RAN connectivity providing VPN access to customer devices 204 . . . 204' indicated by CN9 may be provided by the solution/platform using a wireless network service provided by service providers such as AT&T.

An intrusion prevention system IPS is provided throughout the system to detect unauthorized activities or attempts to intrude on the private network and abort those activities. IPS3 is established when a user establishes a VPN tunnel between its laptop and the Joint Comms Transport cloud, for example, Azure. This VPN tunnel is established using the VPN credentials created via the API, for example, Aeris Admin Agent. IPS3 tunnel allows users to reach to the devices 202 . . . 202''''. Access to the devices 202 . . . 202" " is thus controlled via the IPS3 tunnel and hence is secure.

IPS1 NAT-IPS4 NAT are used to NAT the IP Address pool on which the devices 202 . . . 202'''' are deployed on a network, for example, AT&T/Verizon etc. Since there can be overlapping IP Address ranges, the IP Addresses may be NATTed to resolve that conflict. This NATTing would be two way.

In an embodiment, the process for providing secure access to devices enabled for connectivity using access control on virtual private network includes setting up of VPN via step 1 between the customer devices including device1 202 . . . device4 202''' as well as device1 204 . . . device2 204' and the carrier mobile network operator (MNO), e.g., Verizon, AT&T via VPN service platform 216. The process of setting up of VPN may further include setting up of NAT to create carrier interconnects and resolve IP conflicts and setting up connection between network provider-customer/user communications cloud 218, e.g., Azure, and parent customer cloud services 220, e.g., OEM cloud services.

The VPN is created via step 1 as described above with no access control list (ACL) where access to all the devices is blocked. Admin agent 210 shown as *Aeris* admin agent applies changes via step 2. Once the VPN Credentials are created successfully, user can invoke VPN API's to add/remove IP Address to the ACL. Upon calling those API, the IPTables & IPSet are updated on the VPN servers, for example, StrongSwan servers.

The ACL is updated by adding or removing IP addresses for the customer devices based on new provisioning and/or cancellations. The admin agent applies these changes via step 4. This ACL management is performed by Aeris Admin Agent 210, for example, VPN APIs. Step 5 illustrates connecting VPN, Step 6 illustrates issuing a command and Step 7 illustrates ACL verification. These steps demonstrate the core of the invention, wherein once the VPN credentials have been created, wherein creating or generating VPN credentials may also include dynamically assigning an IP address to the at least one user account and user has added IP addresses to access control list, the user performs steps 5 through 7 to actually reach out to the devices.

The technology stack used to implement the above solution includes NodeJS, MySQL and/or Shell scripts. For example, NodeJS may be used for exposing REST API's which allows for managing the VPN Credentials, Allow/Deny Access to devices; MySQL—Datastore may be used for the Rest API's; StrongSwan—IPSec implementation may be used to allow establishing software VPN; Shell scripts may be used for performing configuration changes on VPN servers, for example, StrongSwan; OS used may be Ubuntu along with Linux utilities such as IPTables, IPSets etc.

The process of automating the software VPN creation process for a customer includes setting up user credentials (username/password) for the customer, setting up of default ACL per VPN user, automate the process to dynamically update ACL for each user (based on device provisioning/cancellation), provide capability to retrieve password for an existing VPN user and provide capability to reset password for an existing VPN user as illustrated and described in FIGS. 3A-3F and the description accompanying FIGS. 3A-3F.

FIGS. 3A-3F illustrate process flow for providing secure access to devices enabled for connectivity using access control on virtual private network in accordance with one or more embodiments of the present invention.

For example, FIGS. 3A and 3B illustrate a process flow for creating VPN credentials 300. The system creating VPN credentials for providing secure access to devices enabled for connectivity using access control on virtual private network in accordance with one or more embodiments includes an application on a client device 302, application programming interface (API) gateway 304, virtual private network (VPN) service 306 and OperatorAdmin or OpAdmin 308.

The application on the client device 302 creates and sends a VPN request to API gateway 304 via step 311 by providing access token along with request payload. The API gateway 304 validates the access token and scope of the request via step 312 and performs one of the two steps: 1. Send error/failure response to the application on the client device 302 via step 313, or 2. Forward request to VPN service 306 if the validation is successful via step 314. Vpn_op_audit_details table contains information about the transaction that happened in the system e.g. create VPN credentials, wherein creating or generating VPN credentials includes dynamically assigning an IP address to the at least one user account. This table helps to maintain a history of all the actions that a user has performed, additionally helps to restore the system in case of loss of data.

The VPN service 306 in turn validates input request including VPNType and ServerCode via step 315 and performs one of the two steps: 1. Send request rejected response if validation fails via step 317, or 2. If validation succeeds, fetch account details from OpAdmin via step 318, receives account details from OpAdmin 308 via step 319 and validate account status via step 320. If the account is not approved, the VPN service sends the request rejected response via step 321 to the ClientApp 302. Vpn_op_audit_details table contains information about the transaction that happened in the system e.g. create VPN credentials. This table helps to maintain a history of all the actions that a user has performed, additionally helps to restore the system in case of loss of data.

If the account status is approved as a result of validation, the VPN server 306 generates user name for the account via step 323, inserts into "vpn_transaction_details" table via step 324, identifies the target list of VPN servers via step 325, submits the transaction for execution via step 326, and return a 202 response (indicating that the request has been accepted for processing) with VPN Username and transaction ID via step 327 to client app 302.

FIG. 3C illustrates a process for checking transaction status. The system for checking transaction status includes an application on a client device 302, application programming interface (API) gateway 304, virtual private network (VPN) service 306 as illustrated. The application on the client device 302 creates and sends a request to API gateway 304 via step 331 to check transaction status by providing access token along with request payload. The API gateway 304 validates the access token and scope of the request via step 332 and performs one of the two steps: 1. Send error/failure response to the application on the client device 302 via step 333 and insert information indicating the failure in "vpn_op_audit_details" table via step 334 and or 2. Forward request to VPN service 306 if the validation is successful via step 335. Once the VPN service receives the forwarded request, it fetches transaction details via step 336, if transactionId is not found, the information is inserted in "vpn_op_audit_details" table via step 337 and the response stating 'request rejected' is sent to the client device 302 via step 338. If transactionId is found, the information is inserted in "vpn_op_audit_details" table via step 339 and a return response 202 (indicating that the request has been accepted for processing) with transaction status is sent to the client device 302 via step 340.

FIG. 3D illustrates a process for retrieving a VPN password. The system for retrieving a VPN password includes an application on a client device 302, application programming interface (API) gateway 304, virtual private network (VPN) service 306 as illustrated. The application on the client device 302 creates and sends a request to API gateway 304 via step 341 to retrieve a VPN password by providing access token along with request payload. The API gateway 304 validates the access token and scope of the request via step 342 and performs one of the two steps: 1. Send error/failure response to the application on the client device 302 via step 343 and insert information indicating the failure in "vpn_op_audit_details" table via step 344 and or 2. Forward request to VPN service 306 if the validation is successful via step 345. Once the VPN service receives the forwarded request, it validates the input request, e.g., vpnusername, via step 346, if vpnusername is not found, the information is inserted in "vpn_op_audit_details" table via step 347 and the response stating 'request rejected' is sent to the client device 302 via step 348. If vpnusername is found, it gets password from "vpn-transaction-details" via step 349, the information is inserted in "vpn_op_audit_details" table via step 350 and a return response 202 (indicating that the request has been accepted for processing) with transaction status is sent to the client device 302 via step 351.

FIG. 3E illustrates a process for updating access control list (ACL). The system for updating access control list (ACL) includes an application on a client device 302, application programming interface (API) gateway 304, virtual private network (VPN) service 306 as illustrated. The application on the client device 302 creates and sends a request to API gateway 304 via step 361 to update access control list (ACL) by providing access token along with request payload. The API gateway 304 validates the access token and scope of the request via step 362 and performs one of the two steps: 1. Send error/failure response to the application on the client device 302 via step 364 and insert information indicating the failure in "vpn_op_audit_details" table via step 363 and or 2. Forward request to VPN service 306 if the validation is successful via step 365. Once the VPN service receives the forwarded request, it validates the input request parameters, e.g., vpnusername, ipaddressformat, opType, ipadress, servercode via step 366 and the information is inserted in "vpn_op_audit_details" table via step 367. If the validation fails, the information is inserted in "vpn_op_audit_details" table via step 368 and the response stating 'incorrect input response' or 'validation failure' is sent to the client device 302 via step 369. If input parameters are found, it submits the transaction for execution via step 370. If the script execution fails, the information is inserted in "vpn_op_audit_details" table via step 371 and a return response indicating a failure is sent to client app 302 via step 372. If the script execution is successful, the information is inserted in "vpn_op_audit_details" table via step 373 and a return response 202 (indicating that the request has been accepted for processing) with transaction status is sent to the client device 302 via step 374.

Figure 3F:
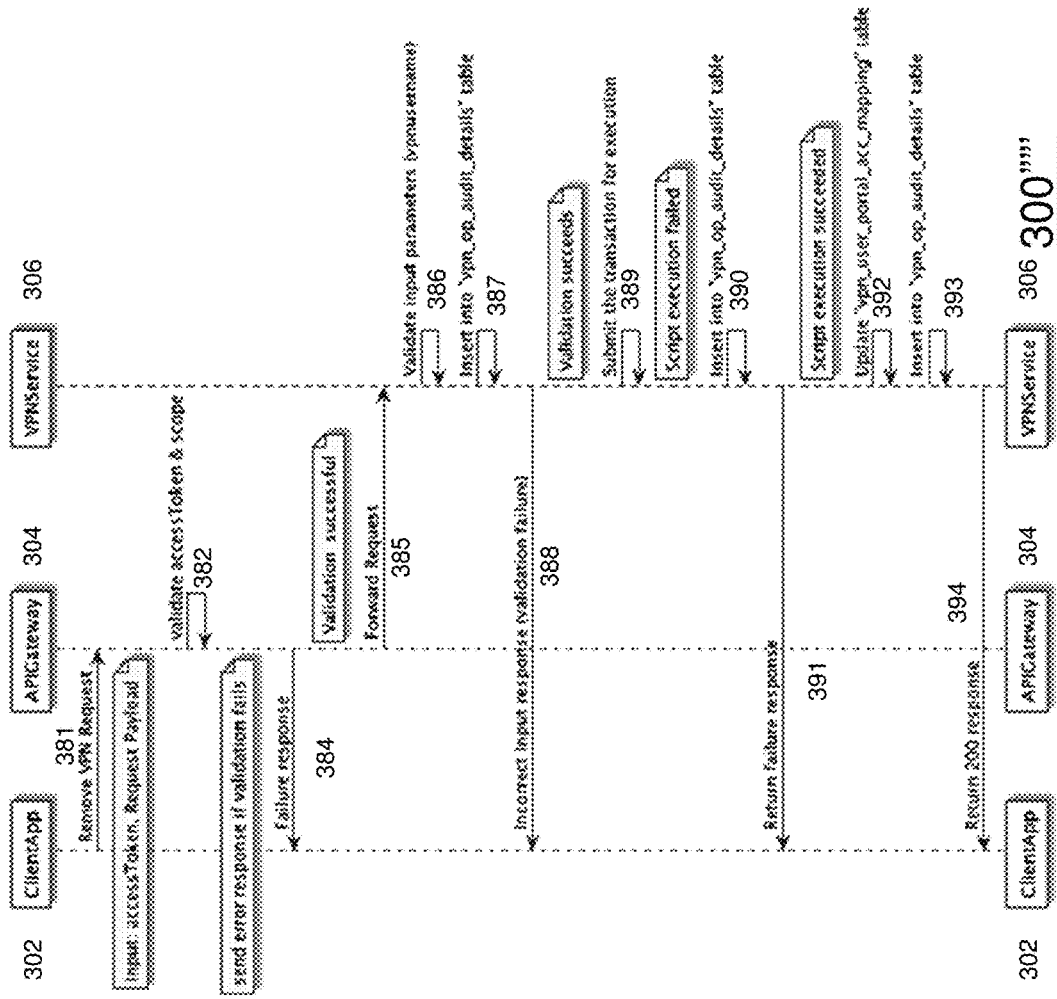

FIG. 3F illustrates a process for removing VPN credentials. The system for removing VPN credentials includes an application on a client device 302, application programming interface (API) gateway 304, virtual private network (VPN) service 306 as illustrated. Removing the VPN credentials may also include removing the dynamically assigned address to the at least one user account and hence removing the assigned IP address from the ACL for that device or a group of devices, thereby updating the ACL for that device or a group of devices. The application on the client device 302 creates and sends a request to API gateway 304 via step 381 to remove VPN credentials by providing access token along with request payload. The API gateway 304 validates the access token and scope of the request via step 382 and performs one of the two steps: 1. Send error/failure response to the application on the client device 302 via step 383 and insert information indicating the failure in "vpn_op_audit_details" table via step 384 and or 2. Forward request to VPN service 306 if the validation is successful via step 385. Once the VPN service receives the forwarded request, it validates the input request, e.g., vpnusername, via step 386, if the input parameters are not found, the information is inserted in "vpn_op_audit_details" table via step 387 and the response stating 'incorrect input response' or 'validation failure' is sent to the client device 302 via step 388. If input parameters are found, it submits the transaction for execution via step 389. If the script execution fails, the information is inserted in "vpn_op_audit_details" table via step 390 and a return response indicating a failure is sent to client app 302 via step 391. If the script execution is successful, the VPN service 306 updates 'vpn_user_portal_acct_mapping' table via step 392, the information is inserted in "vpn_op_audit_details" table via step 393 and a return response 202 (indicating that the request has been accepted for processing) with transaction status is sent to the client device 302 via step 394.

A person skilled in the art may understand that although a number of exemplary flow charts for performing various steps involved in providing secure access to devices enabled for connectivity using access control on virtual private network are provided herein, various other processes may also be used.

A person skilled in the art may understand that although the method, system and computer program product described herein use virtual private network (VPN), the method, system and computer program product may also be used on systems that use communication network but do not require use of VPN. In such case, the functionalities provided by the VPN service 306 illustrated in FIGS. 3 A-F may be provided by a similar service provider platform, for example, an access control service.

Figure 4:
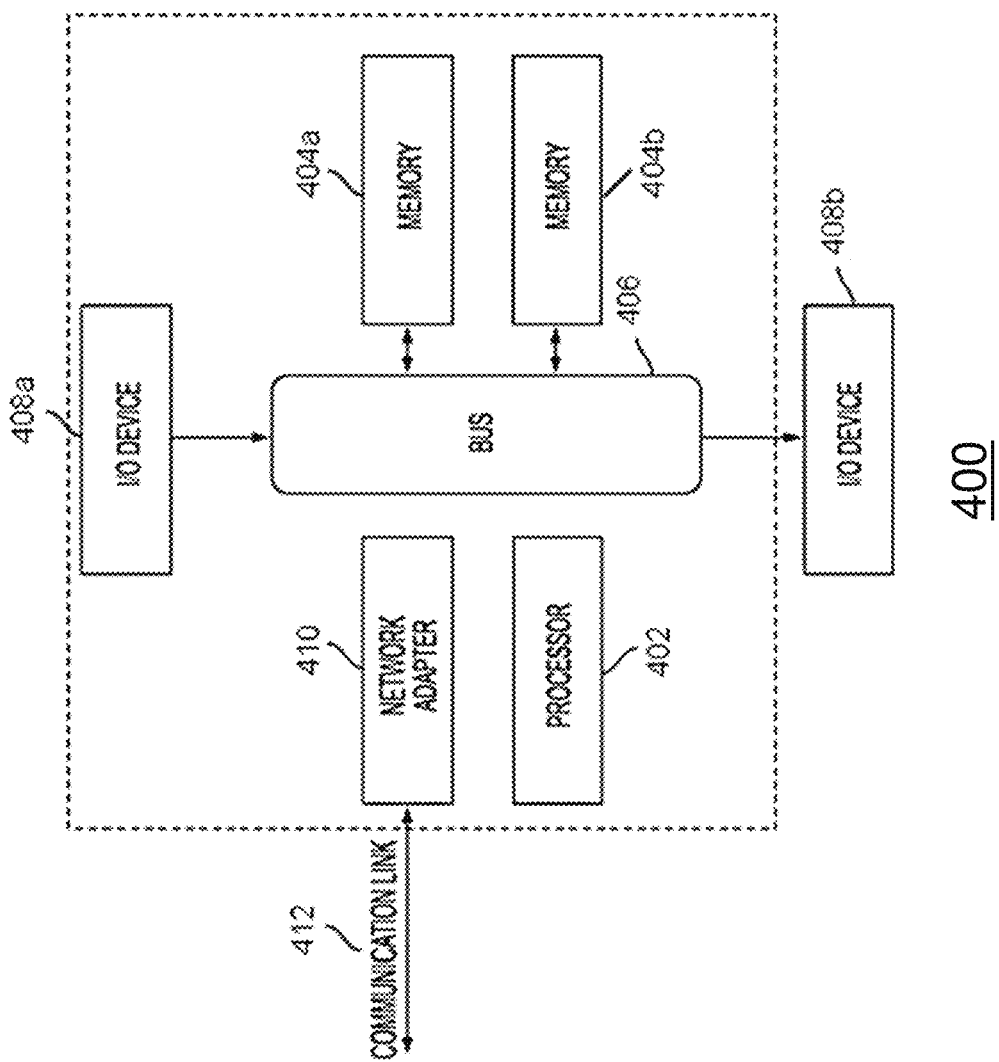
FIG. 4 illustrates a data processing system 400 suitable for storing the computer program product and/or executing program code relating to providing secure access to IoT devices using access control in accordance with one or more embodiments of the present invention.

FIG. 4 illustrates a data processing system 400 suitable for storing the computer program product and/or executing program code for providing secure access to devices enabled for connectivity using access control in accordance with an embodiment of the present invention. The data processing system 400 includes a processor 402 coupled to memory elements 404a-b through a system bus 406. In an embodiment, the data processing system 400 may include more than one processor and each processor may be coupled directly or indirectly to one or more memory elements through a system bus.

Memory elements 404a-b can include local memory employed during actual execution of the program code, bulk storage, and cache memories that provide temporary storage of at least some program code in order to reduce the number of times the code must be retrieved from bulk storage during execution. As shown, input/output or I/O devices 408a-b (including, but not limited to, keyboards, displays, pointing devices, etc.) are coupled to the data processing system 400. I/O devices 408a-b may be coupled to the data processing system 400 directly or indirectly through intervening I/O controllers (not shown).

In FIG. 4, a network adapter 410 is coupled to the data processing system 402 to enable data processing system 402 to become coupled to other data processing systems or remote printers or storage devices through communication link 412. Communication link 412 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, 5G, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

We claim:

1. A computer-implemented method for providing secure access to one or more devices enabled for connectivity using access control, the method comprising:
dynamically allocating a distinct IP pool of IP addresses to at least one user account;
generating virtual private network (VPN) access credentials for the at least one user account;
using a set of application programming interfaces (APIs) to:
assign VPN access credentials to the one or more devices;
dynamically associate each of the one or more devices to the at least one user account;
assign an IP address from the allocated distinct IP pool to each of the one or more devices enabled for connectivity; and
dynamically generate at least one access-control list (ACL) for each of the one or more devices associated with the at least one user account when provisioning the one or more devices; and
restricting access only to the at least one user account via ACL generated for the one or more devices.

2. The computer-implemented method of claim 1, wherein the generating VPN credentials includes dynamically assigning an IP address to the at least one user account; and
enabling access to the one or more devices enabled for connectivity assigned to the at least one user account using the generated VPN credentials.

3. The computer implemented method of claim 1, wherein the one or more devices enabled for connectivity are deployed on a public cloud network or a private cloud network.

4. The computer-implemented method of claim 1, wherein the dynamically generated ACL is updated for the one or more user accounts based on device status, wherein the device status comprises any one or more of: active, suspended and inactive.

5. The computer-implemented method of claim 2, wherein the at least one user account comprises one or more user accounts, wherein the one or more user accounts are arranged in a hierarchical order such that a user belonging to a parent account can access devices that are under its child account but the user belonging to a child account cannot access the devices under its parent account other than the devices under its own account.

6. The computer-implemented method of claim 2, wherein the at least one user account comprises one or more user accounts, and wherein access to the one or more device by the one or more user accounts is managed by the at least one user account or the end user of that device.

7. The computer-implemented method of claim 2, wherein generating VPN credentials further comprises:
sending a VPN request to application programming interface (API) gateway;
validating the VPN request;
receiving account details for the at least one user account;
validating account status of the at least one user account;
generating a VPN username for the account; and
identifying a target list of VPN servers.

8. A system for providing secure access to devices enabled for connectivity using access control, the system comprising: a network carrier interconnect, one or more devices enabled for connectivity; an application programming interface gateway; and an access control service;
wherein the access control service:
dynamically allocates a distinct IP pool of IP addresses to at least one user account;
generates virtual private network (VPN) access credentials for the at least one user account;
uses a set of application programming interfaces (APIs) to:
assign VPN access credentials to the one or more devices;
dynamically associate each of the one or more devices to the at least one user account;
assign an IP address from the allocated distinct IP pool to each of the one or more devices enabled for connectivity; and
dynamically generate at least one access-control list (ACL) for each of the one or more devices associated with the at least one user account when provisioning the one or more devices; and
restricts access only to the at least one user account via ACL generated for the one or more devices.

9. The system of claim 8, wherein:
generating VPN credentials includes dynamically assigning an IP address to the at least one user account; and
enables access to the one or more devices enabled for connectivity assigned to the at least one user account using the generated VPN credentials.

10. The system of claim 8, wherein the one or more devices enabled for connectivity are deployed on a public cloud network or a private cloud network.

11. The system of claim 8, wherein the dynamically generated ACL is updated for the one or more user accounts based on device status, wherein the device status comprises any one or more of: active, suspended and inactive.

12. The system of claim 9, wherein the at least one user account comprises one or more user accounts, wherein the one or more user accounts are arranged in a hierarchical order such that a user belonging to a parent account can access devices that are under its child account but the user belonging to a child account cannot access the devices under its parent account other than the devices under its own account.

13. The system of claim 9, wherein the at least one user account comprises one or more user accounts, and wherein access to the one or more device by the one or more user accounts is managed by the at least one user account or the end user of that device.

14. The system of claim 9, wherein generating VPN credentials further comprises:
receiving a VPN request from application programming interface (API) gateway;
validating the VPN request;
receiving account details for the at least one user account;
validating account status of the at least one user account;
generating a VPN username for the user account; and
identifying a target list of VPN servers.

15. A computer program product stored on a non-transitory computer readable medium comprising computer readable instructions for causing a computer to control an execution of an application for providing secure access to devices enabled for connectivity using access control, the computer readable instructions comprising:

dynamically allocating a distinct IP pool of IP addresses to at least one user account;

generating virtual private network (VPN) access credentials for at least one user account;

using a set of application programming interfaces (APIs) to:

assign VPN access credentials to the one or more devices;

dynamically associate each of the one or more devices to the at least one user account;

assign an IP address from the allocated distinct IP pool to each of the one or more devices enabled for connectivity; and dynamically generate at least one access-control list (AOL) for each of the one or more devices associated with the at least one user account when provisioning the one or more devices; and restricting access only to the at least one user account via ACL generated for the one or more devices.

16. The computer program product of claim 15, wherein generating VPN credentials includes dynamically assigning an IP address to the at least one user account; and enabling access to the one or more devices enabled for connectivity assigned to the at least one user account using the generated VPN credentials.

17. The computer program product of claim 15, wherein the one or more devices enabled for connectivity are deployed on a public cloud network or a private cloud network.

18. The computer program product of claim 15, wherein the AOL is updated for the one or more user accounts based on device status, wherein the device status comprises any one or more of: active, suspended and inactive.

19. The computer program product of claim 16, wherein the at least one user account comprises one or more user accounts, wherein the one or more user accounts are arranged in a hierarchical order such that a user belonging to a parent account can access devices that are under its child account but the user belonging to a child account cannot access the devices under its parent account other than the devices under its own account.

20. The computer program product of claim 16, wherein the at least one user account comprises one or more user accounts, and wherein access to the one or more device by the one or more user accounts is managed by the at least one user account or the end user of that device.

21. The computer program product of claim 16, wherein generating VPN credentials further comprises:

sending a VPN request to application programming interface (API) gateway;

validating the VPN request;

receiving account details for the at least one user account;

validating account status of the at least one user account;

generating a VPN username for the user account; and identifying a target list of VPN servers.

* * * * *